F. A. WHITNEY.
SPOUT FOR SEALED CONTAINERS.
APPLICATION FILED MAR. 14, 1917.

1,296,447.

Patented Mar. 4, 1919.

INVENTOR
F. A. Whitney,
BY Victor J. Evans
ATTORNEY

WITNESSES

UNITED STATES PATENT OFFICE.

FRANCIS A. WHITNEY, OF KABUGAO APAYAO, PHILIPPINE ISLANDS.

SPOUT FOR SEALED CONTAINERS.

1,296,447.　　　　　Specification of Letters Patent.　　Patented Mar. 4, 1919.

Application filed March 14, 1917. Serial No. 154,357.

*To all whom it may concern:*

Be it known that I, FRANCIS A. WHITNEY, a citizen of the United States, residing at Kabugao Apayao, Mountain Province, Philippine Islands, have invented new and useful Improvements in Spouts for Sealed Containers, of which the following is a specification.

This invention relates to improvements in spouts for sealed containers.

In the majority of instances in which the contents of a sealed container is to be delivered therefrom a puncture is made in the said container and a determined quantity of the liquid in the said container is permitted to flow therefrom. This method is not hygienic and also involves other undesirable features, inasmuch as the contents of the container are subjected to evaporation, while at the same time it may be mentioned that the hole provided by the puncture admits of the entrance of dust, insects, etc., to the can or container.

It may be therefore considered the primary object of the present invention to provide an outlet spout for sealed containers whereby the contents of the container may be effectively drawn therefrom and which at the same time will protect the said contents from exterior contamination.

A simple and satisfactory reduction of the improvement is illustrated by the accompanying drawing, in which.

Figure 1:
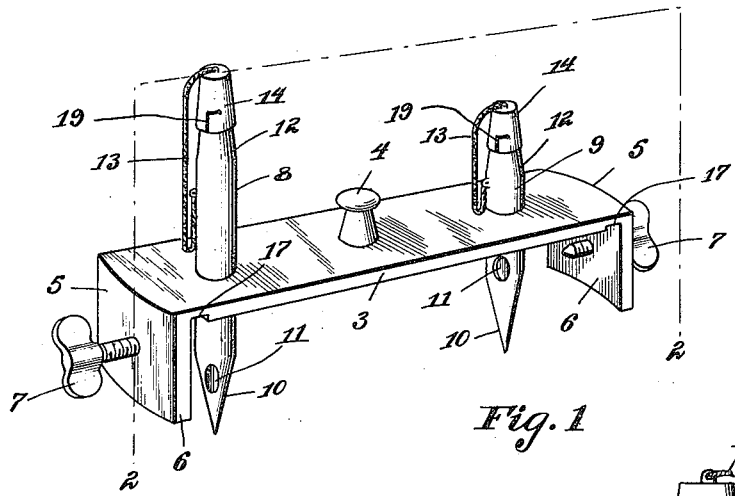
Figure 1 is a perspective view illustrating the application of the improvement.
Figure 3:
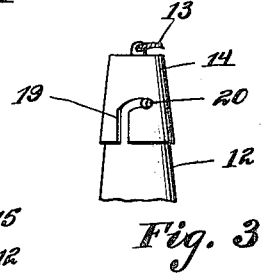
Fig. 3 is a detail elevation illustrating the manner of securing the caps to the outer and open ends of the entering member.
Figure 2:
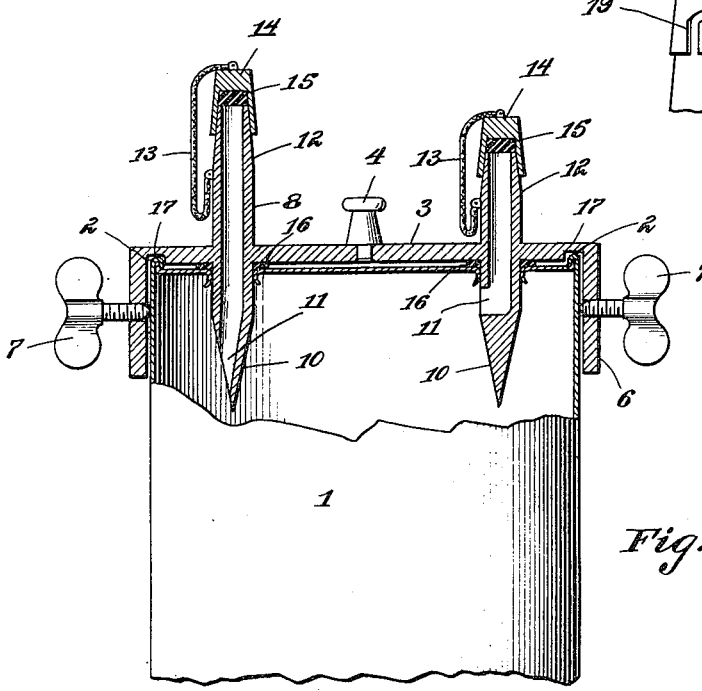
Fig. 2 is a central transverse sectional view approximately on the line 2—2 of Fig. 1.

Referring now to the drawing in detail, the numeral 1 designates any ordinary construction of receptacle such as is designed for containing milk or the like, and the said receptacle may be, upon its outer edge, provided with the usual rib or bead 2.

The improvement is broadly indicated by the numeral 3, and comprises a substantially U-shaped member. The straight or horizontal element of the member 3 has centrally arranged thereon a projecting portion 4 which furnishes the same with a handle and the angular or side portions of the said member 3 have their inner peripheries preferably rounded, as indicated by the numerals 5. The side members indicated for distinction by the numerals 6 are also provided with threaded orifices receiving thumb screws 7, and by this arrangement it will be noted that the device may be arranged upon receptacles of varying shapes or exterior contours, it being understood that the side members or legs 6 are spaced away from each other a distance greater than that of the cross sectional diameter of the receptacle.

Integrally formed upon the horizontal or straight member of the improvement and adjacent each of the side or leg members thereof are tubular members 8 and 9 respectively, the same extending beyond both of the faces or surfaces of the said side members, and the inner or lower portions of each of the members 8 and 9 are pointed or spear-shaped as indicated by the numerals 10 and these portions are adapted to provide means whereby the same may be readily inserted in the top of the can or receptacle 1. The members 8 and 9, adjacent to their entering points 10 are each provided with an opening 11, entering the bore of said members, and the outer ends of the said members 8 and 9 are preferably flared or cone-shaped, as indicated by the numerals 12, while the numerals 13 indicate flexible elements connected one with each of the members 8 and 9 and which has secured thereto a cap 14, one of said caps being arranged to engage with one of the ends 12 of each of the members 8 and 9. Each of the caps 14 has arranged therein a compressible member or gasket 15 which is adapted to effect the sealing of the entrance or mouth of the tubular members 8 and 9.

The tubular members 8 and 9 upon what I will term their inner portions have arranged around the same gaskets 16—16 each of a compressible nature, whereby the hole formed by the puncture in the receptacle 1 will be sealed, and the horizontal or straight portion of the improvement adjacent the sides or flanges thereof is formed with transversely extending slots or depressions 17 to receive the ribs 2 of the receptacle 1.

It is, of course, to be understood that one of the tubes 9 is employed as an air entrance to the receptacle and the other tube, 9, is employed as an outlet spout for the receptacle.

In order that the caps 14 may be effectively locked upon the conical outer ends of the members 8 and 9, I provide each of the said caps with a substantially L-shaped slot 19 and the conical ends 12 of each of the members 8 and 9 with a pin 20 designed to be received in the slot, the said pin being first directed through the vertical or straight passage of the slot and then the cap is turned to bring the pin into the offset passage of the slot. The walls provided by the offset passage are slightly inclined and the contact of the pin 20 with the said walls will have a tendency of drawing the caps 14 in the direction of the members 8 and 9 to effect the locking of said caps to the said members.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. In a device for the purpose set forth, a substantially U-shaped member bridging the receptacle, means upon the arms of said U-shaped member engaging with the sides of the receptacle to hold the said member upon the receptacle, spout members having pointed ends upon the member and adapted to be inserted in the receptacle, caps for the spout members, and compressible elements for the said spout members contacting with the receptacle at the puncture portions thereof.

2. In a device for the purpose set forth, a substantially U-shaped member, adjustable binding elements upon the arms of the said member, the connecting element of the member adjacent to the arms thereof having transverse slots, tubular members upon said connecting element each having an inner pointed end, and a port disposed adjacent to the said pointed end and communicating with the bore thereof, compressible gaskets upon the tubular members, caps for the tubular members, and compressible elements within the said caps.

3. In a spout for a beaded sealed container, a flat member arranged over the top of the container said member having transverse slots for receiving the bead of the receptacle, said member having depending sides, adjustable binding elements passing therethrough and contacting with the diametrically opposite sides of the receptacle, tubular members integrally formed on the straight member and extending in opposite directions therefrom, one of said members being of a greater length than the other and both of said members having their inner ends pointed and provided with openings communicating with the bore thereof, the port providing the communication with the bore of the shorter member being arranged a considerable distance above the pointed end of the said tubular member, both of said tubular members having their outer surfaces flared inwardly at the ends thereof, pins on said surfaces, cap members having flared sides received over the ends, each of said caps having an L-shaped slot therein designed to co-engage with the referred to pins, and flexible elements retaining the caps on the respective tubes.

In testimony whereof I affix my signature.

FRANCIS A. WHITNEY.